Nov. 24, 1959  B. D. BEAMISH  2,914,246
APPARATUS FOR DETECTING AND COUNTING OBJECTS
Filed Jan. 10, 1957  4 Sheets-Sheet 1

INVENTOR.
BERNARD D. BEAMISH
BY
Moses, Nolte + Nolte
ATTORNEYS

Nov. 24, 1959     B. D. BEAMISH     2,914,246
APPARATUS FOR DETECTING AND COUNTING OBJECTS
Filed Jan. 10, 1957     4 Sheets-Sheet 2
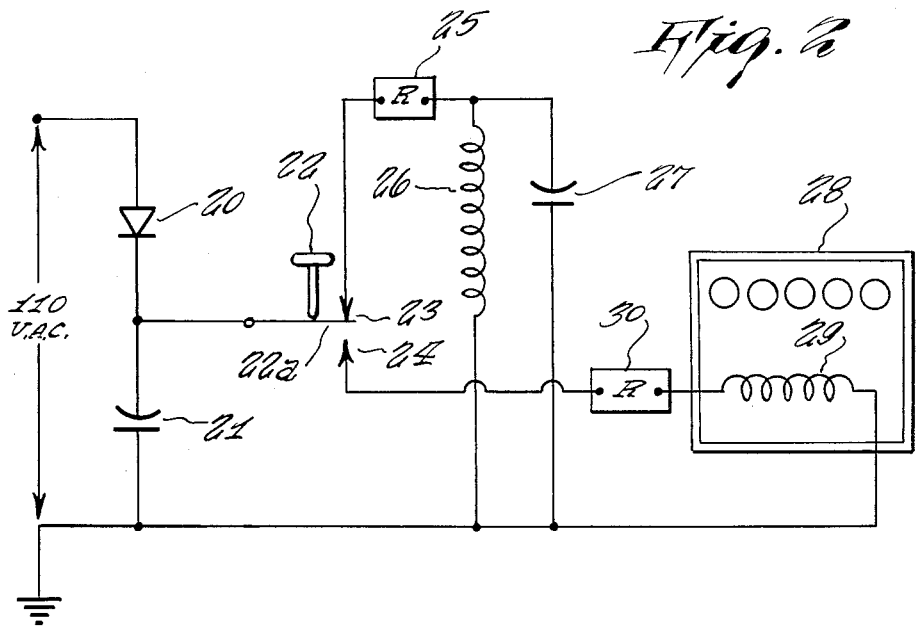
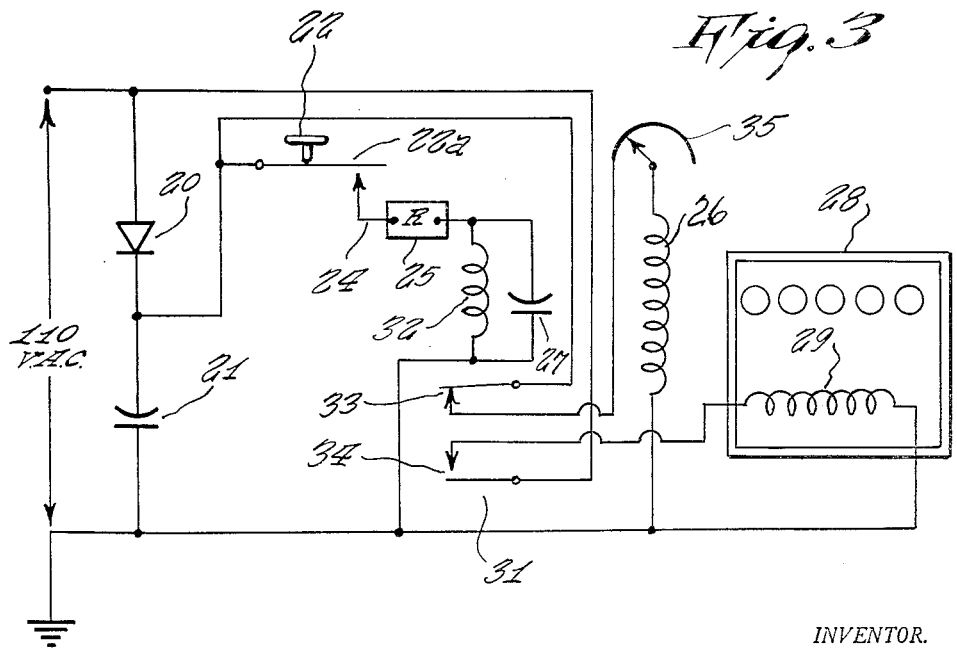
INVENTOR.
BERNARD D. BEAMISH
BY
Moses, Nolte + Nolte
ATTORNEYS Nov. 24, 1959 — B. D. BEAMISH — 2,914,246
APPARATUS FOR DETECTING AND COUNTING OBJECTS
Filed Jan. 10, 1957 — 4 Sheets-Sheet 3

INVENTOR.
BERNARD D. BEAMISH
BY
Moses, Nolte & Nolte
ATTORNEYS

Nov. 24, 1959  B. D. BEAMISH  2,914,246
APPARATUS FOR DETECTING AND COUNTING OBJECTS
Filed Jan. 10, 1957  4 Sheets-Sheet 4
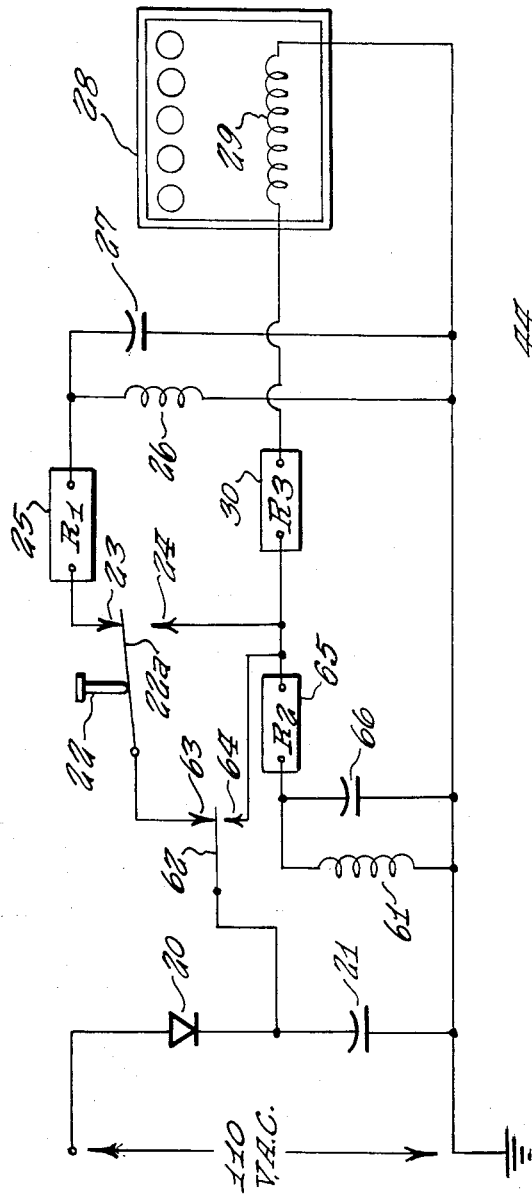
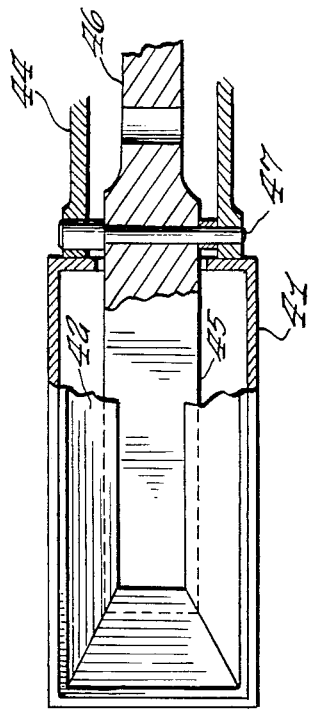
INVENTOR.
BERNARD D. BEAMISH
BY
Moses, Nolte & Nolte
ATTORNEYS

United States Patent Office 2,914,246
Patented Nov. 24, 1959

2,914,246

APPARATUS FOR DETECTING AND COUNTING OBJECTS

Bernard Delacour Beamish, Mount Vernon, N.Y.

Application January 10, 1957, Serial No. 633,460

18 Claims. (Cl. 235—98)

This invention which is a continuation-in-part of co-pending application Serial No. 513,121, now abandoned, relates to a sensitive impact counting and detecting mechanism for small, light objects, such as cartridge cases, ball bearing balls or small pieces made on automatic punch presses or automatic lathes. Such items during manufacture fall in a somewhat random manner from the producing machinery, frequently accompanied by oil, coolant, water, chips and other foreign matter, which makes counting of such objects by photo-electric cells impractical. They are of insufficient mass to trip even the lightest of commercial toggle switches in falling.

According to one embodiment of the invention, such pieces are directed to fall, for the purpose of counting, on a very light baffle plate, which is pivoted so as to permit a limited movement of say approximately 3/16" at one end thereof. The baffle plate assembly is stopped both above and below so as to restrict its movement to this relatively small arc. It is held upwards against the upper limiting stops by a light spring, but tends to be drawn downwards by a small electro-magnet attracting a light steel armature attached to the lower surface of the plate at its free end. The force of the spring and the force of the magnetic field are so adjusted that at rest the spring over-balances the field and holds the baffle plate against the upper stops. The impact of a very small object, as light as a quarter of a gram, falling from a height of say 4" and striking the baffle plate, however, momentarily deflects the baffle plate downwards, extending the spring and bringing the armature of the baffle plate closer to the magnet. It is a well known principle that when a spring is extended the increased tension is a linear function of the increased distance. When an armature approaches a magnet the increased pull of the magnet is as the square of the decreased distance. A very slight dislocation of the baffle plate in the direction of the magnet causes the magnetic field to over-power the spring and draw the light baffle plate rapidly down to a lower stop. The downward movement of the baffle plate activates a commercial toggle limit switch such as the type known as a "microswitch," having a "make" contact and a "break" contact. The actuation of this switch breaks the circuit to the magnet. The magnet, however, continues to be energized for a fraction of a second by the connection of a capacitor across the coil of the magnet. It is desirable that the magnet should have a high resistance value, and the magnet used may be suitably a telephone relay coil having a resistance of 5,000 ohms.

The simultaneous "make" contact of the toggle switch sends current into a standard commercial electric counter, and the time-delay of the system, provided by the above capacitor, is such as to meet the pulse duration requirements of the counter. When the capacitor is discharged into the magnet coil, the magnet becomes de-energized and releases the baffle plate. This opens the "make" contact of the toggle switch and breaks the circuit to the counter, permitting its rachet to re-set. At the same time, the "break" contact of the switch closes, closing the circuit of the magnet. However, the insertion of a suitable resistor between the switch contact and the magnet and capacitor delays the complete energizing of the magnet until the capacitor is charged. Therefore, the baffle plate has time to return to its normal position before the full force of the magnet is applied. The cycle is then complete and the baffle plate is ready to receive another impact. The entire cycle, depending on the type of counter employed may be kept, for example, between 25 and 100 milliseconds, permitting counting speeds up to 1,000 a minute or more; the limiting factor of the counting speed, in general, being the maximum output of the electro-magnetic counter employed.

The entire device is enclosed in a rugged container so that it can be placed in the finished work receptacle of an automatic machine. The lower stop under the baffle plate is of sturdy construction so that in the event of a wrench or heavy tool being dropped on the baffle plate, it will not be damaged. Secondary baffles may be arranged so that the work pieces will fall from a desirable height on to the target area of the baffle plate. By adjusting the strength of the field of the magnet and the strength of the counteracting spring, the device can be adjusted to various degrees of sensitivity so as to distinguish between work pieces on the one hand and turnings, drops of coolant, etc. on the other. It is also shock mounted so as not to be affected by vibrations of the machine.

The device may be provided with means for discouraging or preventing tampering designed to produce false counting.

Fig. 2 is a circuit diagram of one embodiment of the invention;

Fig. 3 is a circuit diagram of another embodiment of the invention;

Fig. 5 is a sectional view taken along the line 5—5 of Fig. 4;

Fig. 6 is a circuit diagram of another embodiment of the invention including anti-tampering means.

Figure 1:
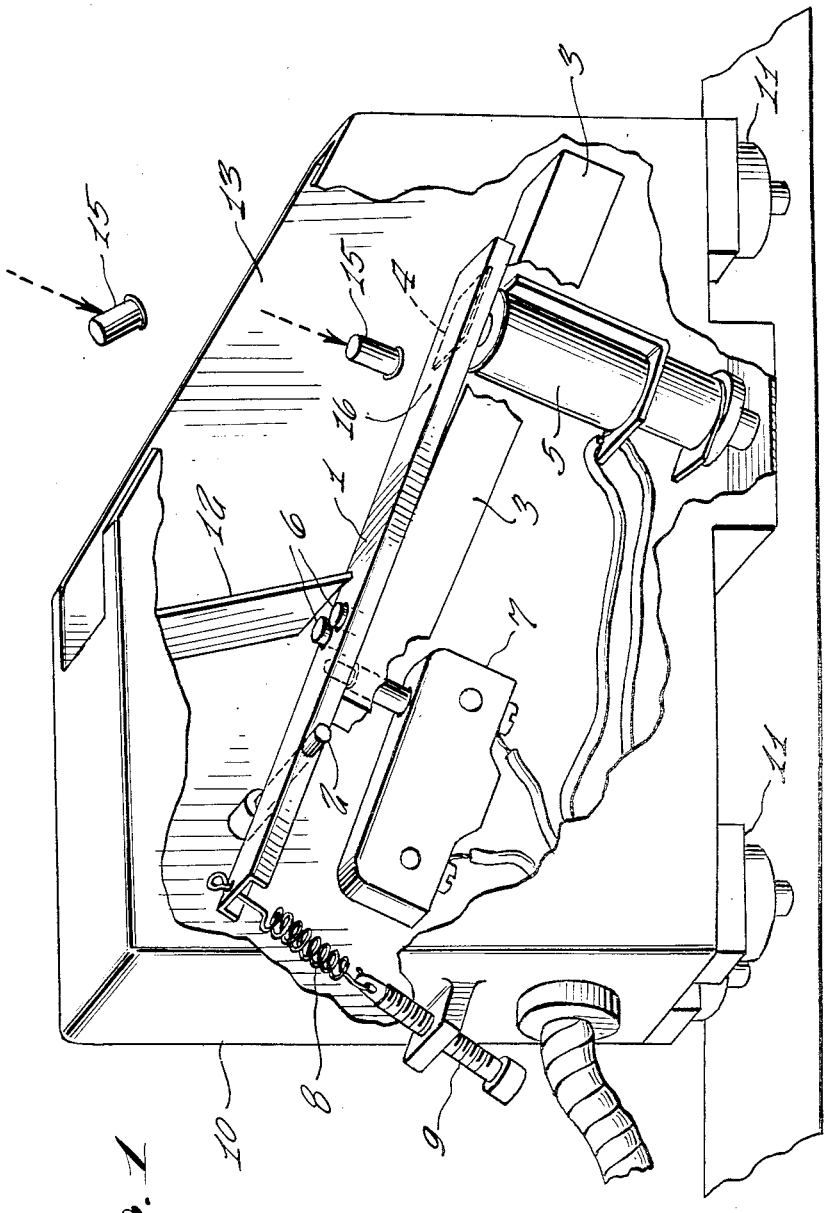
Fig. 1 is an isometric view with a portion of the housing removed to show the arrangement of the elements of the apparatus.

Fig. 1 shows the assembly of the mechanical mechanism and some of the electrical elements. The remaining elements are mounted in a separate box. The moving baffle 1 is a light, stiff aluminum sheet formed as a channel. It is supported and rotates on pin 2. Below baffle 1 is a support member 3, which acts as a lower stop and as a rugged support in case a heavy object is dropped on the baffle. This support member 3 has a large cut-out through which the pole piece of the magnet projects and a smaller cut-out through which the acting finger of the switch 7 projects. Riveted or bonded to the lower face of the baffle plate 1 at its extreme lower end is an armature 4 consisting of a small square of tin plate or other light steel.

Directly below this armature, and separated from it when the baffle plate is in the upper position by about 3/16", is a telephone relay coil 5 with a return pole piece. Projecting upwards from support 3 through holes in the baffle plate are two capscrews 6 which act as adjustable upper stops for the baffle plate. Immediately below the baffle plate and near its axis is a sensitive relay toggle switch 7 having three contact leads to common, normally open, and normally closed contacts.

When the baffle plate is in the upper position, it is slightly removed from the pin of the toggle switch so it does not engage the toggle switch until it approaches the end of its downward stroke when the magnetic pull is approaching its maximum value. This is so that the spring of the toggle switch will not affect the balance of the counteracting spring and magnetic field.

At the upper end of the baffle plate 1 is fastened a small extension spring 8, which is fastened to the frame at its other end by an adjustable screw 9. The entire mechanism is mounted in a suitable enclosure, indicated by 10, which is mounted on standard commercial aircraft shock mountings indicated by 11.

In operation the pieces to be counted or detected 15 are directed from various fixed baffle plates 12, 13 so as to strike the active baffle plate 1 on its target area 16. Impact of the object moves the baffle plate on its supporting pin through a small arc in a clockwise direction, thus increasing the force of the field at a greater rate than the force of the spring.

Figure 2 is a diagram illustrating the circuit of one embodiment of the invention. A half wave rectifier 20 operating from a 110 volts, A.C. power supply is connected to a filter capacitor 21 of adequate size to maintain a fairly even voltage on the system. A relay toggle switch 22 having a common contact 22a, and normally closed and normally open contacts 23, 24. The contact 23 is connected through a resistor to the magnet coil 26, across which is connected a capacitor 27 for providing a time delay. A commercial counter 28, having an actuating ratchet solenoid 29 is connected to contact 24 through a resistor of appropriate value so that a commercial counter, intended to operate on 110 volts, A.C. current, may be operated by the D.C. current supplied by rectifier 20.

The electrical operation is as follows: When the apparatus is at rest, the switch contacts 22a and 23 will be closed, supplying direct current from the rectifier 20 and the filter capacitor 21 to the magnet coil 26. The capacitor 27 will be charged. Upon the actuation of the baffle plate 1, switch 22 is operated, opening contacts 22a and 23, and thereby disconnecting the magnet and the capacitor 27 from the source of power. The capacitor 27 will discharge through the magnet which momentarily will continue to hold the baffle plate in its downward position. At the same time, switch contacts 22a and 24 are closed to actuate the ratchet solenoid 29 of the counter. When the capacitor 27 is fully discharged, the coil 26 is de-energized, the baffle plate 1 returns to its upper position and switch 22 returns to its normal position. This switch then closes the circuit of capacitor 27 and magnet 26. The flow of current, however, is limited by the resistor 25, and the voltage across the magnet coil 26 will only rise as the capacitor 27 picks up its charge, which is a true function of the values of the capacitor 27 and resistor 25. The transit time of the spring-returned baffle plate is very short, and the field of the magnet will not build up its full strength until the baffle plate has returned to its upper position and is out of reach of the field, where it remains until again actuated by an external impact.

Figure 3 shows an alternative circuit for providing faster action of the magnet. The same reference numerals are used to designate like elements in the circuits of Figures 2 and 3. A telephone relay 31 is added in Fig. 3. This telephone relay has a coil 32 and a set of contacts 33 which are normally closed and a set of contacts 34 which are normally open. Switch 22 now uses only two contacts; the common 22a and the normally open 24. The depression of this switch actuates relay 31, which performs the functions previously performed by switch 22; that is, it disconnects the magnet through contacts 33 and sends an impulse into the ratchet solenoid 29 of the magnetic counter through contacts 34. The time delay capacitor 27 and resistor 25 are now connected to the relay coil 32, which regulates the time delay of the system in precisely the same manner as described above. Variable resistor 35 is placed in series with the magnet 26 so that the force of the magnet can be delicately adjusted without reference to the time delay. In this case it may be more convenient to operate the magnetic counter on alternating current, as indicated.

Figure 4:
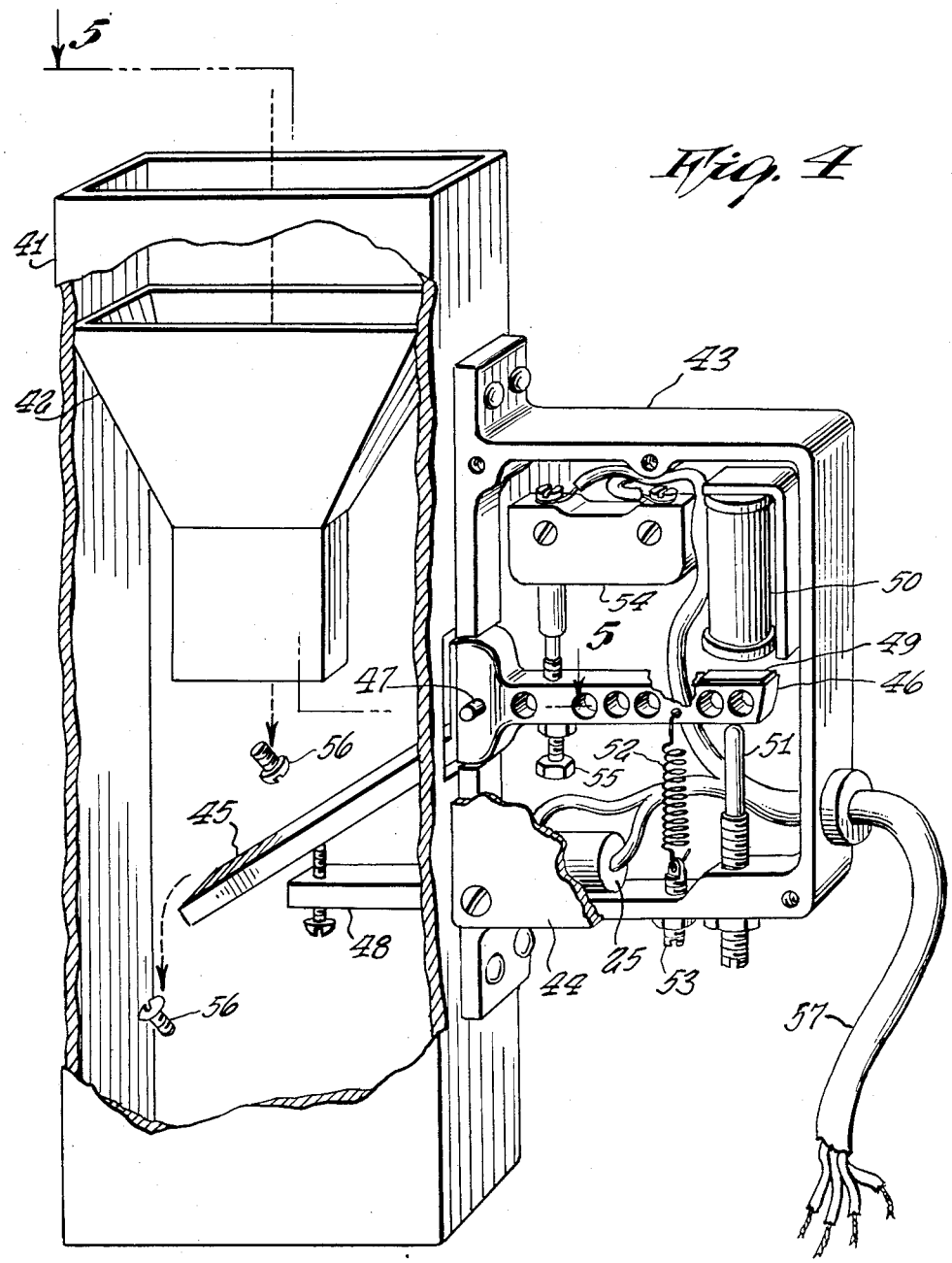
Fig. 4 is an isometric view of another embodiment of the invention.

Figure 4 shows a modification of the mechanism shown in Fig. 1. The passage for the objects to be counted is through a section of square steel tubing 41 which is mounted vertically, inside of which is a pyramidal baffle or chute 42 to direct the objects squarely onto the impact plate 45. Attached to the side of the tube 41 is a flat aluminum box 43 having a cover plate 44 shown partially cut away in this figure.

The impact plate 45 is preferably a light aluminum sheet bent to form a longitudinal channel. It is fastened at its upper end to an aluminum bar 46 which may be lightened by perforation, the whole assembly being mounted on a pin 47 as shown in Fig. 5, so as to constitute a balance. The bar 46 and pin 47 are located inside box 43 but the impact plate 45 projects through a hole in the steel tubing 41 in an inclined position beneath the baffle 42 such that small objects 56 will strike it in falling and thereby be deflected so as to fall downward off the end of the impact plate. Beneath impact plate 45 is an adjustable support strut 48 to support the impact plate in case of any heavy object falling on it.

Attached to the inner extremity of bar 46 on its top surface is a thin steel armature 49. Directly above armature 49 is a relay coil 50 such as a commercial telephone relay coil having a pole or heelpiece so placed that its magnetic flux will directly engage armature 49. Bar 46 rests at this extremity on the end of an adjustable pin 51. Pin 51 is screwed through a suitable hole in the bottom of box 43 and is adjustable from outside so as to set the magnetic gap between armature 49 and the polepiece of relay 50. The bar 46 is held down upon pin 51 against the magnetic action of the coil by a spring 52 which is retained by an adjustable screw 53. When the impact plate 45 is undisturbed, the tension spring 52 is sufficient to resist the pull of the coil 50. When an object strikes the impact plate 45 deflecting it slightly downward and thereby deflecting the bar 46 upwards, then the increased magnetic attraction of the coil 50, which varies as an inverse function of the square of the magnetic gap, is sufficient to overcome the spring and move the bar upwards toward the coil at an accelerating rate. In practice, the armature 49 is coated on its top surface with varnish so as to leave a small residual gap between the armature and the coil when the armature is drawn fully upwards.

Mounted in the box 43 above bar 46, but further toward pin 47 is a sensitive limit switch such as a "microswitch" 54 with its actuator pointed downwards. Directly below this actuator is a vertical adjustment screw 55 mounted in the bar 46 and set so as to engage the actuator only when the bar 46 is near the end of its upward stroke.

For convenience in wiring, one of the circuit elements, namely resistor 25 is included in box 43. The other elements are in a separate control box on which is mounted the commercial counter 28. Cable 57 connects the terminals of the coil 50, the points of the switch 54, and the resistor 25 to the control box.

Figure 6 shows a modification of the circuit shown in Fig. 2. The elements 20 through 30 inclusive, are identical in function and operation with the same elements shown in Fig. 2, but a protective device has been added to discourage tampering with the counter. With the apparatus shown in Fig. 1 it is possible by resting a screw driver or some other convenient tool delicately on the top of the baffle plate to so adjust its normal position that it will oscillate, thus running up a very rapid count when in fact no objects are passing through the counter. In order to prevent such tampering, a relay, the coil of which is shown at 61 is added and the current to the limit switch 22 which activates the counting mechanism, is supplied through the normally closed contacts 62, 63 of relay 61, as shown in the diagram. Each time that contacts 22a, 24 of switch 22 close, in addition to supplying current to the coil 29 of the counter 28 it also supplies current to the relay 61 through a resistor 65. This relay is shunted by a capacitor 66. The values of the coil 61, the resistor 65 and the shunt capacitor 66 are such that, in the normal operation of the counter, the current supply to resistor 65 is insufficient to charge capacitor 66 adequately so as to permit closing the relay 61 and in the time interval between counts part of the charge supplied to capacitor 66 during the preceding counting pulse will drain off through the coil 61. Thus, at the normal rate of counting, capacitor 66 will never build up enough charge to permit the closing of relay 61 which therefore will not operate. If, however, due to tampering, the counter is caused to oscillate at its periodic frequency, the resulting rapid sequence of impulses will build up sufficient charge on capacitor 66 to close the relay 61. The relay thus closed automatically locks up on its normally open contact 64 and at the same time current impulses to the counter are discontinued so that it will not operate. In order to release relay 61 and permit the counter again to operate normally, it is necessary to disconnect the entire mechanism from the power supply. Relay 61 will be operated also if contact 62 is depressed and held down for an excessive time.

Thus the apparatus of Fig. 6 tends to discourage tampering and as a further modification, relay 61 may be of the mechanically locking type so that in order to re-start the counter, it would be necessary to release a latch which would not be available or accessible to the machine operator using the counter.

The apparatus may be used without a counter; the pulses supplied to solenoid 29 then being used to detect the impact of objects which are so light or delicate as to make it impractical to trip a commercial toggle or limit switch. In this case, the actuating baffle plate may be arranged to operate in a horizontal plane.

Many modifications and variations of the illustrative embodiments disclosed herein will be apparent and, therefore, the true spirit and scope of the invention is defined in the following claims.

I claim:

1. Apparatus for detecting objects, comprising a baffle member in the path of said objects and having a magnetic portion, an electromagnet including a winding adjacent said magnetic portion for attracting said baffle member in one direction, means for holding said baffle member spaced from said relay, switching means responsive to the movement of said baffle member in said one direction, a source of current, said switching means normally connecting said source of current to the winding, an output circuit, said switching means being responsive to movement of said baffle member in said one direction to connect said source of current to said output circuit and disconnect said source of current from said winding, and means for mounting said baffle member for movement toward said winding in response to an impact of an object thereon.

2. Apparatus according to claim 1, wherein said means for holding said baffle member spaced from said relay includes means for elastically biasing said baffle member in the opposite direction.

3. Apparatus according to claim 1, including means for retarding the energization and de-energization of said winding.

4. Apparatus according to claim 1, including an electric counter having a solenoid connected to said output circuit.

5. Apparatus, according to claim 3, wherein the means for retarding the energization and de-energization of the winding includes a resistor connected in series therewith and a condenser in parallel therewith.

6. Apparatus for detecting light objects comprising a baffle member, means for mounting said baffle member so that it is impacted by said objects and moved in one direction in response to an impact, an electromagnet positioned to attract said baffle member in said one direction, a current source, a relay, switching means responsive to the movement of said baffle member in said one direction for connecting said current source to the winding of said relay, said relay including a pair of normally closed contacts connected in series with the winding of said electromagnet and said current source, an output circuit, said relay having a second pair of normally open contacts connected between said output circuit and said current source, whereby a current pulse is supplied to said output circuit in response to the energization of said relay.

7. Apparatus according to claim 6, including an electric counter connected to said output circuit.

8. Apparatus according to claim 7, including the means for retarding the energization and de-energization of the winding of said relay.

9. Apparatus according to claim 6, wherein said current source includes means for supplying a direct current to the windings of said relay and said electromagnet and an alternating current to the output circuit.

10. Apparatus for detecting objects, comprising baffle means including a member in the path of said objects and a magnetic portion fixed to said baffle member, an electromagnet including a winding adjacent said magnetic portion for attracting said baffle means in one direction, said baffle means holding said magnetic portion spaced from said winding, a source of current, switching means normally connecting said source of current to said winding, an output circuit, said switching means being responsive to movement of said member in said one direction to connect said source of current to said output circuit and disconnect said source of current from said winding, and means for mounting said baffle means for movement of said magnetic portion toward said winding in response to an impact of an object on said member.

11. Apparatus according to claim 10, wherein said magnetic portion is held spaced from said winding by means for elastically biasing said member in the opposite direction.

12. Apparatus according to claim 10, including means for retarding the energization and de-energization of said winding.

13. Apparatus, according to claim 12, wherein the means for retarding the energization and de-energization of the winding includes a resistor connected in series therewith and a condenser in parallel therewith.

14. Apparatus, according to claim 10, including an electric counter having a solenoid connected to said output circuit.

15. Apparatus, according to claim 14, including anti-tampering means responsive to predetermined actuation of said switching means for permanently preventing said electric counter from counting.

16. Apparatus, according to claim 10, including means for permanently disconnecting the electromagnet from said source of current in response to actuation of said switching means at a predetermined rate.

17. Apparatus, according to claim 16, wherein the means for disconnecting the electromagnet includes a relay having a winding connected to the source of current through said switching means.

18. Apparatus, according to claim 17, including a circuit connected to said relay winding having a predetermined time constant.

References Cited in the file of this patent

UNITED STATES PATENTS

| 2,487,265 | Nelson | Nov. 8, 1949 |
| 2,493,464 | Nelson | Jan. 30, 1950 |
| 2,697,281 | Watson | Dec. 21, 1954 |

FOREIGN PATENTS

| 702,591 | Great Britain | Dec. 19, 1951 |